(12) United States Patent
Huang

(10) Patent No.: US 11,607,610 B2
(45) Date of Patent: Mar. 21, 2023

(54) DRIFTING ACTION EXECUTION METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Xiongfei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/332,872

(22) Filed: May 27, 2021

(65) Prior Publication Data

US 2021/0283500 A1    Sep. 16, 2021

Related U.S. Application Data

(63) Continuation of application No. PCT/CN2020/083097, filed on Apr. 3, 2020.

(30) Foreign Application Priority Data

May 5, 2019   (CN) .......................... 201910368919.9

(51) Int. Cl.
    *A63F 13/42*      (2014.01)
    *A63F 13/2145*    (2014.01)
    (Continued)

(52) U.S. Cl.
    CPC .......... *A63F 13/42* (2014.09); *A63F 13/2145* (2014.09); *A63F 13/57* (2014.09); *A63F 13/803* (2014.09)

(58) Field of Classification Search
    CPC ...... A63F 13/2145; A63F 13/42; A63F 13/57; A63F 13/803; A63F 13/44
    See application file for complete search history.

(56) References Cited

U.S. PATENT DOCUMENTS 10,449,451 B2 * 10/2019 Utsugi ................ A63F 13/803
11,045,736 B2 *  6/2021 Hayashi .............. A63F 13/803
(Continued)

FOREIGN PATENT DOCUMENTS

CN    101485933 A    7/2009
CN    102109924 A    6/2011
(Continued)

OTHER PUBLICATIONS

Tencent Technology, ISR, PCT/CN2020/083097, Jun. 30, 2020, 2 pgs.

(Continued)

*Primary Examiner* — Chase E Leichliter
(74) *Attorney, Agent, or Firm* — Morgan, Lewis & Bockius LLP

(57) ABSTRACT

This application discloses an action execution method in a virtual gaming environment performed at a terminal device. The method includes: setting a key status of a first virtual key to a touchable state in a process of running a round of game when a target object controlled by a user of the terminal device completes an action combination once; monitoring a first touch operation performed on the first virtual key in the touchable state; controlling, when the first touch operation is detected, the target object to perform the acceleration operation, and monitoring, within a target time period, a second touch operation performed on a control key configured to control the target object to perform a target action; and controlling, when the second touch operation is detected within the target time period, the target object to perform the target action in a process of performing the acceleration operation.

20 Claims, 7 Drawing Sheets

(51) Int. Cl.
*A63F 13/57* (2014.01)
*A63F 13/803* (2014.01)

(56) References Cited

U.S. PATENT DOCUMENTS

| | | | |
|---|---|---|---|
| 11,071,911 B2* | 7/2021 | Yabuki | A63F 13/426 |
| 11,103,784 B2* | 8/2021 | Yabuki | A63F 13/2145 |
| 11,198,058 B2* | 12/2021 | Yabuki | A63F 13/55 |
| 2013/0137514 A1* | 5/2013 | Ichimura | G07F 17/3211 463/31 |
| 2013/0294016 A1* | 11/2013 | Wilson | A63F 13/235 361/679.01 |
| 2013/0297246 A1* | 11/2013 | Wilson | A63F 13/20 702/141 |
| 2019/0336860 A1* | 11/2019 | Yabuki | A63F 13/577 |
| 2019/0336863 A1* | 11/2019 | Hayashi | A63F 13/69 |
| 2020/0078668 A1* | 3/2020 | Yabuki | A63F 13/2145 |
| 2020/0086209 A1* | 3/2020 | Yabuki | A63F 13/803 |
| 2020/0086214 A1* | 3/2020 | Yabuki | A63F 13/42 |
| 2021/0008445 A1* | 1/2021 | Hayashi | A63F 13/803 |
| 2021/0187393 A1* | 6/2021 | Huang | A63F 13/50 |
| 2021/0283500 A1* | 9/2021 | Huang | A63F 13/2145 |

FOREIGN PATENT DOCUMENTS

| | | |
|---|---|---|
| CN | 106861186 A | 6/2017 |
| CN | 108525295 A | 9/2018 |
| CN | 108733288 A | 11/2018 |
| CN | 109107152 A | 1/2019 |
| CN | 109513210 A | 3/2019 |
| CN | 110013671 A | 7/2019 |
| EP | 3441120 A1 | 2/2019 |
| JP | H07116353 A | 5/1995 |
| JP | 2016120131 A | 7/2016 |

OTHER PUBLICATIONS

Tencent Technology, WO, PCT/CN2020/083097, Jun. 30, 2020, 5 pgs.
Tencent Technology, IPRP, PCT/CN2020/083097, Nov. 2, 2021, 6 pgs.
Tencent Technology, SG Office Action, Singapore Patent Application No. 11202105571W, dated Aug. 30, 2022, 9 pgs.

* cited by examiner

DRIFTING ACTION EXECUTION METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/083097, entitled "ACTION EXECUTION METHOD AND DEVICE, STORAGE MEDIUM AND ELECTRONIC DEVICE" filed on Apr. 3, 2020, which claims priority to Chinese Patent Application No. 201910368919.9, filed with the State Intellectual Property Office of the People's Republic of China on May 5, 2019, and entitled "ACTION EXECUTION METHOD AND APPARATUS, STORAGE MEDIUM, AND ELECTRONIC DEVICE", all of which are incorporated herein by reference in their entirety.

FIELD OF THE TECHNOLOGY

This application relates to the field of computers, and specifically, to action execution.

BACKGROUND OF THE DISCLOSURE

Currently, in a game scene of a racing game application, different racing tracks are usually designed for players. The racing tracks include curves with different turning angles. To shorten a time required for a target object controlled by a player to pass a curve, the player usually uses a control key set in a human-computer interaction interface to control the target object to perform a drifting action when the target object passes the curve.

However, the player manually controls the target objects to perform the drifting action at different operation levels. Consequently, the target object is susceptible to a centrifugal force during drifting and tends to slide out of a side of the curve, or even goes out of control and crashes into a wall. As a result, a time required for the target object to complete a racing task is increased. That is, in an action execution method provided in the related art, a player needs to have relatively high operation skills to control a target object to perform a drifting action. Consequently, the player is prone to operation errors, resulting in the problem of a relatively high execution error rate of the foregoing action.

For the foregoing problem, no effective solution has been provided yet.

SUMMARY

Embodiments of this application provide an action execution method and apparatus, a storage medium, and an electronic device, to resolve at least the technical problem of a relatively high error rate of action execution existing in the related art.

According to an aspect of the embodiments of this application, an action execution method in a virtual gaming environment is performed at a terminal device, the method including: setting a key status of a first virtual key to a touchable state in a process of running a round of game when a target object controlled by a user of the terminal device completes an action combination once, the first virtual key being configured to trigger an acceleration operation performed on the target object; monitoring a first touch operation performed on the first virtual key in the touchable state; controlling, when the first touch operation is detected, the target object to perform the acceleration operation, and monitoring, within a target time period, a second touch operation performed on a control key configured to control the target object to perform a target action, the target time period being less than or equal to a first time threshold; and controlling, when the second touch operation is detected within the target time period, the target object to perform the target action in a process of performing the acceleration operation.

According to another aspect of the embodiments of this application, an action execution apparatus is further provided, including: a setting unit, configured to set a key status of a first virtual key to a touchable state in a process of running a round of game when a target object controlled by a user of the terminal device completes an action combination once, the first virtual key being configured to trigger an acceleration operation performed on the target object; a first monitoring unit, configured to monitor a first touch operation performed on the first virtual key in the touchable state; a second monitoring unit, configured to: control, when the first touch operation is detected, the target object to perform the acceleration operation, and monitor, within a target time period, a second touch operation performed on a control key configured to control the target object to perform a target action, the target time period being less than or equal to a first time threshold; and a first execution unit, configured to control, when the second touch operation is detected within the target time period, the target object to perform the target action in a process of performing the acceleration operation.

According to still another aspect of the embodiments of this application, a non-transitory computer-readable storage medium is further provided, storing a plurality of computer programs, the computer programs being configured to perform, when executed by a processor, the foregoing action execution method.

According to still another aspect of the embodiments of this application, an electronic device is further provided, including a memory, a processor, and a computer program that is stored in the memory and executable on the processor, the processor performing the foregoing action execution method through the computer program.

According to an aspect of the embodiments of this application, a computer program product including instructions is further provided, the computer program product, when run on a computer, causing the computer to perform the foregoing action execution method.

In the embodiments of this application, in a process of running a round of game, when a first touch operation used for triggering an acceleration operation performed on a target object is detected and a second touch operation performed on a control key configured to control the target object to perform a target action is detected within a target time period, the target object is controlled to perform the target action in a process of performing the acceleration operation, so that the target object adjusts a trajectory of the target object in the target action by using a velocity generated in the acceleration operation, to reduce a quantity of times of collision generated by the target object in the round of game, thereby reducing an error rate of action execution, and further resolving the problem of a relatively high error rate caused by different manual operation levels of players in the related art.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

Figure 1:
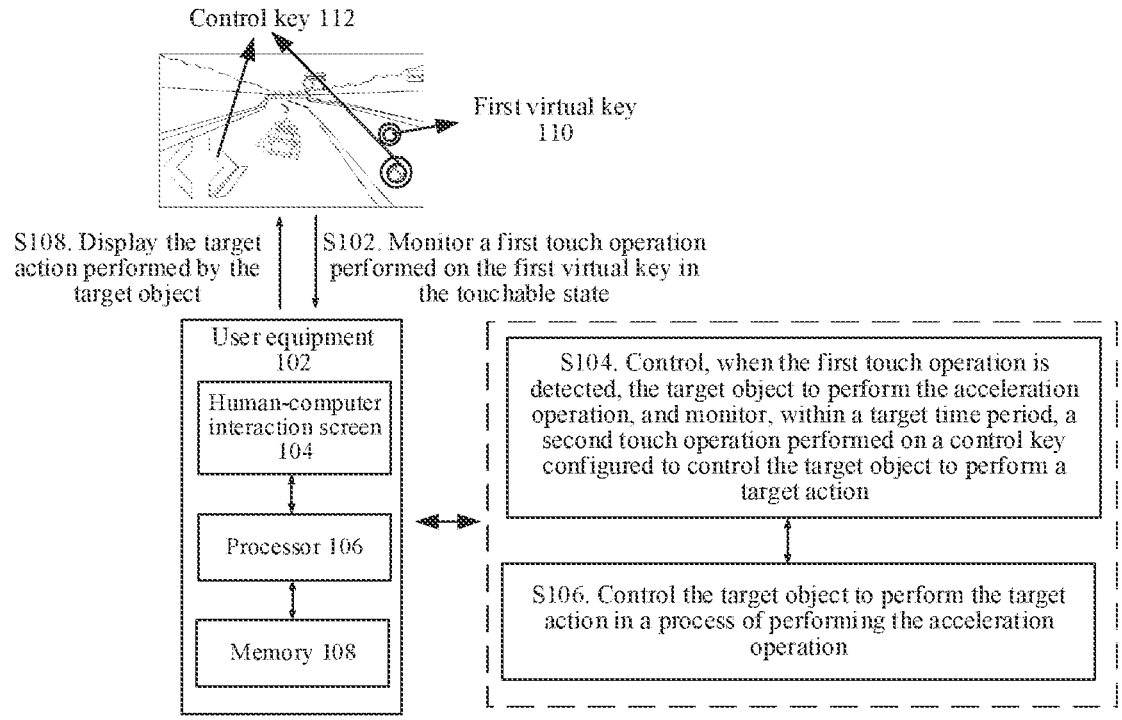
FIG. 1 is a schematic diagram of a hardware environment of an action execution method according to an embodiment of this application.

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first". "second", and so on are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

An embodiment of this application provides an action execution method, to effectively resolve the technical problem of a relatively high error rate of action execution existing in the related art.

Specifically, in the action execution method provided in the embodiments of this application, a key status of a first virtual key is first set to a touchable state in a process of running a round of game when a target object controlled by a user of the terminal device completes an action combination once, a first touch operation performed on the first virtual key in the touchable state is then monitored, to control, when the first touch operation is detected, the target object to perform an acceleration operation. In addition, a second touch operation performed on a control key configured to control the target object to perform a target action is monitored within a target time period, and the target object is then controlled to perform, when the second touch operation is detected within the target time period, the target action in a process of performing the acceleration operation. The first virtual key is configured to trigger the acceleration operation performed on the target object. The target time period is less than or equal to a first time threshold.

It may be seen that in the embodiments of this application, in a process of running a round of game, when a first touch operation used for triggering an acceleration operation performed on a target object is detected and a second touch operation performed on a control key configured to control the target object to perform a target action is detected within a target time period, the target object is controlled to perform the target action in a process of performing the acceleration operation, so that the target object adjusts a trajectory of the target object in the target action by using a velocity generated in the acceleration operation, to reduce a quantity of times of collision generated by the target object in the round of game, thereby reducing an error rate of action execution, and further resolving the problem of a relatively high error rate caused by different manual operation levels of players in the related art.

It is to be understood that the action execution method provided in the embodiments of this application is applicable to a data processing device such as a terminal device or a server. The terminal device may be specifically a smartphone, a computer, a personal digital assistant (PDA), a tablet computer, or the like. The server may be specifically an application server, or may be a Web server. During actual deployment, the server may be an independent server, or may be a cluster server or a cloud server.

If the action execution method provided in the embodiments of this application is performed by the terminal device, the terminal device obtains various touch operations (such as an action combination) performed by a user on a client, and performs the action execution method provided in the embodiments of this application. If the action execution method provided in the embodiments of this application is performed by the server, the server obtains various touch operations that are performed by a user on a user of the terminal device and uploaded by the terminal device, and performs the action execution method provided in the embodiments of this application.

That the server performs a process of controlling the target object to perform a target action in a process of performing the acceleration operation may be specifically: directly controlling, by the server, the target object to perform the target action in the process of performing the acceleration operation; or first generating, by the server, a control instruction used for controlling the target object to perform the target action in a process of performing the acceleration operation, and transmitting the control instruction to the terminal device, so that the terminal device then controls, based on the control instruction, the target object to perform the target action in the process of performing the acceleration operation. Similarly, that the server performs a process of setting a key status of a first virtual key to a touchable state may be specifically: directly setting, by the server, the key status of the first virtual key to the touchable state; or first generating, by the server, a status change instruction used for setting the key status of the first virtual key to the touchable state, and transmitting the status change instruction to the terminal device, so that the terminal device then sets the key status of the first virtual key to the touchable state based on the status change instruction.

To make the technical solutions provided in the embodiments of this application more comprehensible, an application scenario to which the action execution method provided in the embodiments of this application is applicable is described below by using an example in which the action execution method provided in the embodiments of this application is applied to user equipment (that is, the terminal device) on which a user of the terminal device of a game application is installed and that is shown in FIG. 1.

In one implementation, the action execution method may be, but is not limited to being, applied to a hardware environment shown in FIG. 1. Assuming that a user of the terminal device of a game application (which is a user of the terminal device of a racing game application shown in FIG. 1) is installed on user equipment 102. The user equipment 102 includes a human-computer interaction screen 104, a processor 106, and a memory 108. The human-computer interaction screen 104 is configured to monitor a human-computer interaction operation (such as a touch operation) by using a human-computer interaction interface corresponding to the client. The processor 106 is configured to: generate a corresponding operation instruction according to the human-computer interaction operation, and control, in response to the operation instruction, a target object controlled by the user of the terminal device to perform a corresponding action. The memory 108 is configured to store the operation instruction and attribute information related to the target object. For example, the attribute information may include, but is not limited to, key status information of a virtual key used for controlling a target virtual object in a human-computer interaction interface displayed by the client.

The user equipment 102 sets a key status of a first virtual key 110 displayed on the human-computer interaction screen 104 to a touchable state in a process of running a round of game when the target object controlled by the user of the terminal device completes an action combination once. In step S102, the processor 106 monitors a first touch operation performed on the first virtual key in the touchable state. Next, in step S104, when the first touch operation is detected, the target object is controlled to perform an acceleration operation, and a second touch operation performed on a control key 112 configured to control the target object to perform a target action is monitored within a target time period. In step S106, the target object is controlled, when the second touch operation is detected within the target time period, to perform the target action in a process of performing the acceleration operation. In Step S108, the target action performed by the target object is displayed on the human-computer interaction screen 104.

It may be seen that in this embodiment, in a process of running a round of game, when a target object controlled by a user of the terminal device completes an action combination once, a key status of a first virtual key configured to trigger an acceleration operation performed on the target object is set to a touchable state. Next, a first touch operation performed on the first virtual key is monitored. In a case that the first touch operation is detected, the target object is controlled to perform the acceleration operation, and a second touch operation performed on a control key configured to control the target object to perform a target action is monitored within a target time period. In a case that the second touch operation is detected within the target time period, the target object is controlled to perform the target action in a process of performing the acceleration operation, so that the target object adjusts a trajectory of the target object in the target action by using a velocity generated in the acceleration operation, to reduce a quantity of times of collision generated by the target object in the round of game, thereby reducing an error rate of action execution, and further resolving the problem of a relatively high error rate caused by different manual operation levels of players in the related art.

In one implementation, the user equipment may be, but is not limited to, a terminal device that can run clients of applications, such as a mobile phone, a tablet computer, a notebook computer, a PC, and the like. The foregoing is merely an example, and this is not limited in this embodiment.

Figure 2:
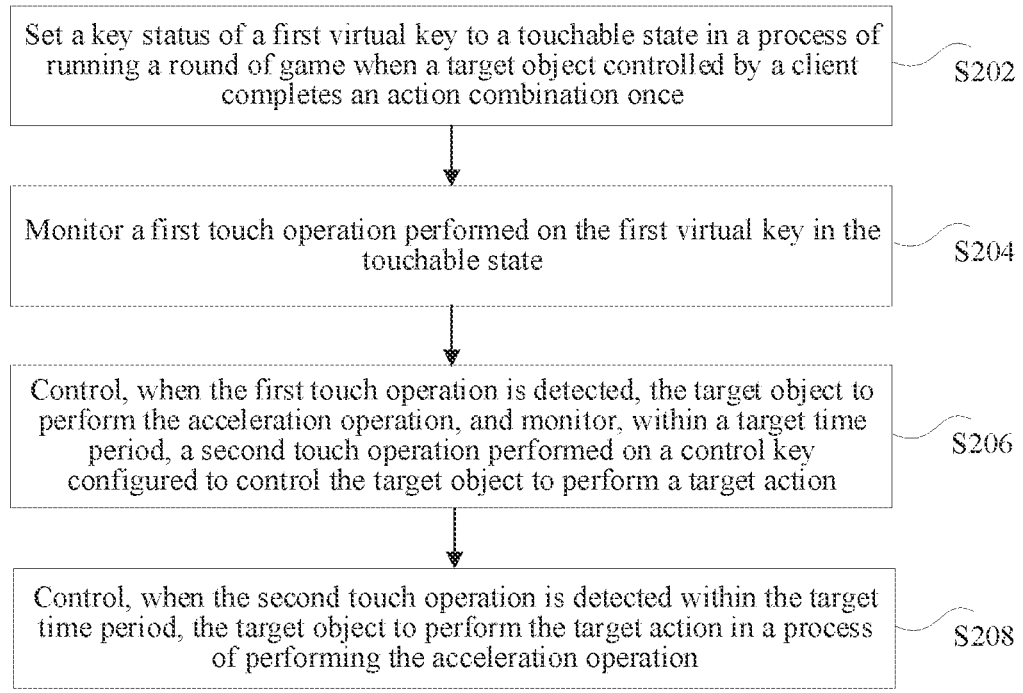
FIG. 2 is a flowchart of an action execution method according to an embodiment of this application.

In one implementation, as shown in FIG. 2, the action execution method includes the following steps:

S202. Set a key status of a first virtual key to a touchable state in a process of running a round of game when a target object controlled by a user of the terminal device completes an action combination once, the first virtual key being configured to trigger an acceleration operation performed on the target object.

S204. Monitor a first touch operation performed on the first virtual key in the touchable state.

S206. Control, when the first touch operation is detected, the target object to perform the acceleration operation, and monitor, within a target time period, a second touch operation performed on a control key configured to control the target object to perform a target action, the target time period being less than or equal to a first time threshold.

S208. Control, when the second touch operation is detected within the target time period, the target object to perform the target action in a process of performing the acceleration operation.

In one implementation, the action execution method may be, but is not limited to being, applied to: setting, in a process of running a round of game when a target object controlled by a user of the terminal device completes an action combination once, a key status of a first virtual key configured to trigger an acceleration operation performed on the target object to a touchable state, and then automatically adjusting, by using a velocity generated when the target object performs the acceleration operation, an action trajectory of the target object for performing the target action, to reduce a quantity of times of collision of the target object, thereby reducing an error rate when the target object performs the target action. For example, the game application is a racing game application. The target object that participates in a round of game may be, but is not limited to, a virtual object such as a virtual character, virtual equipment, or a virtual vehicle operated in the racing game application.

In a process of controlling the target object to perform a task in a round of game in a racing track, if it is detected that the target object performs an acceleration operation and it is detected, within a target time period, that the target object is controlled to perform a drifting action, the target object is controlled to perform the drifting action by using a velocity increased after the acceleration operation, so that an action trajectory of the target object formed in a process of performing the drifting action deviate to a traveling direction of the target object, thereby reducing a quantity of times of collision of the target object in the racing track. This is not limited in this embodiment.

It may be seen that in this embodiment, in a process of running a round of game, when a first touch operation used for triggering an acceleration operation performed on a target object is detected and a second touch operation performed on a control key configured to control the target object to perform a target action is detected within a target time period, the target object is controlled to perform the target action in a process of performing the acceleration operation, so that the target object adjusts a trajectory of the target object in the target action by using a velocity generated in the acceleration operation, to reduce a quantity of times of collision generated by the target object in the round of game, thereby reducing an error rate of action execution, and further resolving the problem of a relatively high error rate caused by different manual operation levels of players in the related art.

Figure 3:
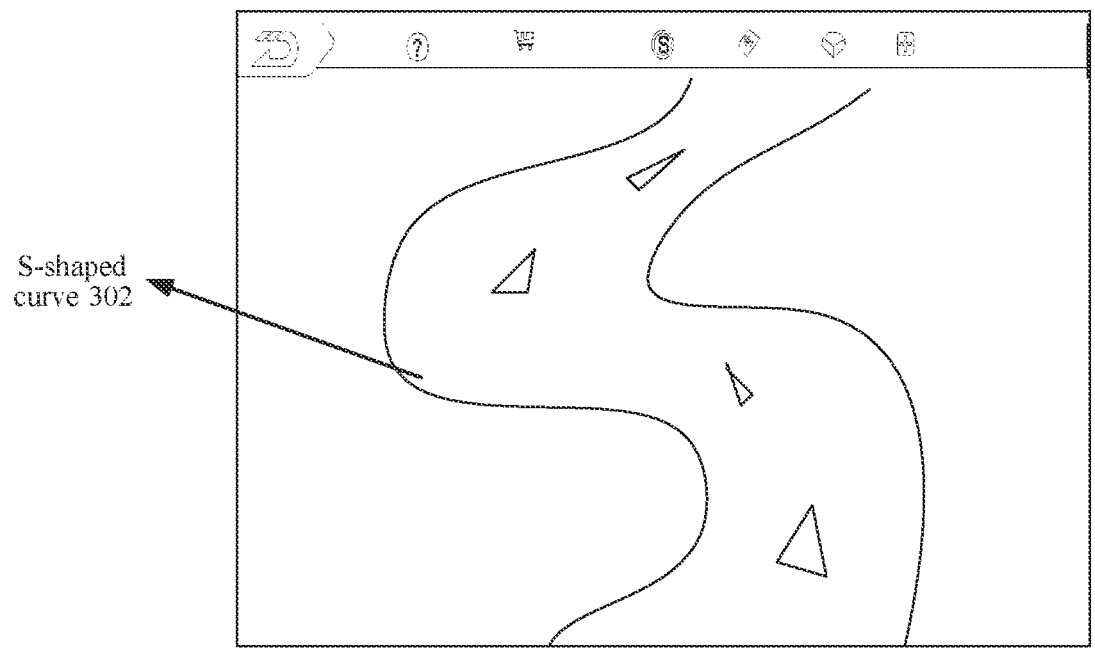
FIG. 3 is a schematic diagram of a curve according to an embodiment of this application.

In one implementation, the action combination may include, but is not limited to, at least two actions to be performed by the target object when the target object passes a curve set in the racing track. For example, the curve may include, but is not limited to, an S-shaped curve, and the corresponding action combination may include, but is not limited to, a two-way drifting action. For example, when an S-shaped curve 302 shown in FIG. 3 is set in the track, the action combination to be performed by the target object may include, but is not limited to, a leftward drifting action and a rightward drifting action. The foregoing is merely an example, and this is not limited in this embodiment.

Further, in this embodiment, the target action may include, but is not limited to, a drifting action to be performed by the target object when the target object passes the curve set in the racing track. That is, the target action may include, but is not limited to, one action in the action combination, such as the leftward drifting action or the rightward drifting action. The foregoing is merely an example, and this is not limited in this embodiment.

Figure 4:
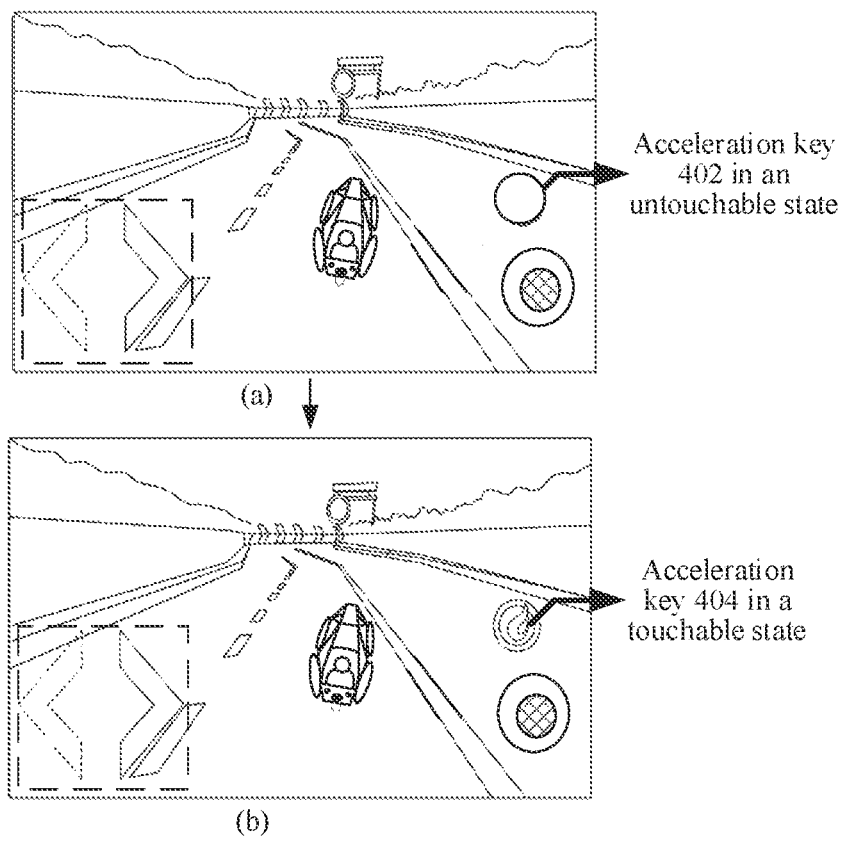
FIG. 4 is a schematic diagram of a change of a key status of an optional first virtual key according to an embodiment of this application.

In one implementation, the first virtual key may be, but is not limited to being, configured to trigger the acceleration operation performed on the target object. The key status of the first virtual key may include, but is not limited to, a touchable state, and an untouchable state. In a process of running a round of game, when the target object completes an action combination once, the first virtual key correspondingly adjusts the key status of the first virtual key displayed in a human-computer interaction interface. For example, the key status is adjusted from an untouchable state to a touchable state. For example, the first virtual key is an "acceleration key". As shown in FIG. 4, an acceleration key 402 in an untouchable state is a hollow circle (as shown in (a) in FIG. 4), and is incapable of accepting a touch operation. An acceleration key 404 in a touchable state displays a corresponding icon (such as the flame shown in (b) in FIG. 4), and is capable of accepting a touch operation.

In one implementation, after the first touch operation performed on the first virtual key in the touchable state is detected, the target object is controlled, in response to the first touch operation, to perform the acceleration operation, and the second touch operation is monitored within the target time period, to determine whether to control the target object to perform the target action in a process of performing the acceleration operation. That is, a velocity boost effect generated by the acceleration operation may be used for interfering with the target action to be performed by the target object, so that an action trajectory of the target object deviates to a traveling direction of the target object rather than a sliding direction, to weaken the impact of a centrifugal force experienced by the target object in a process of performing the target action, thereby reducing a quantity of times of collision of the target object generated due to sliding, and reducing an error rate when the target object performs the target action.

The target time period is less than or equal to a first time threshold. The first time threshold may be, but is not limited to being, set to different values according to different real-time requirements. In this embodiment, when the first touch operation is detected, the second touch operation is monitored within the target time period, to ensure that a time difference between the two touch operations is as small as possible, and the acceleration operation and the target action may be simultaneously performed. The foregoing is merely an example, and this is not limited in this embodiment.

Figure 5:
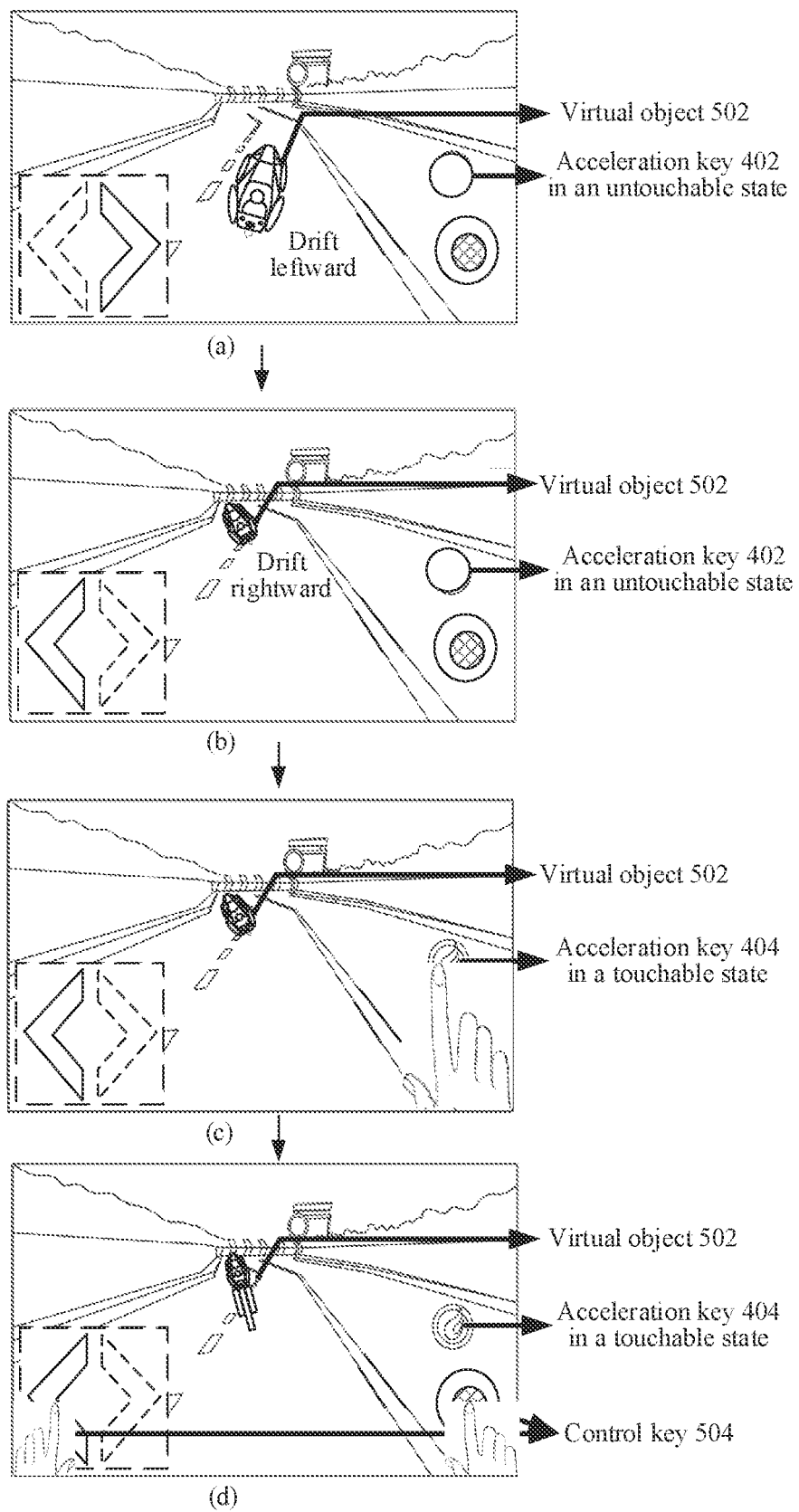
FIG. 5 is a schematic diagram of a process of controlling a target object to perform a target action according to an embodiment of this application.
Figure 6:
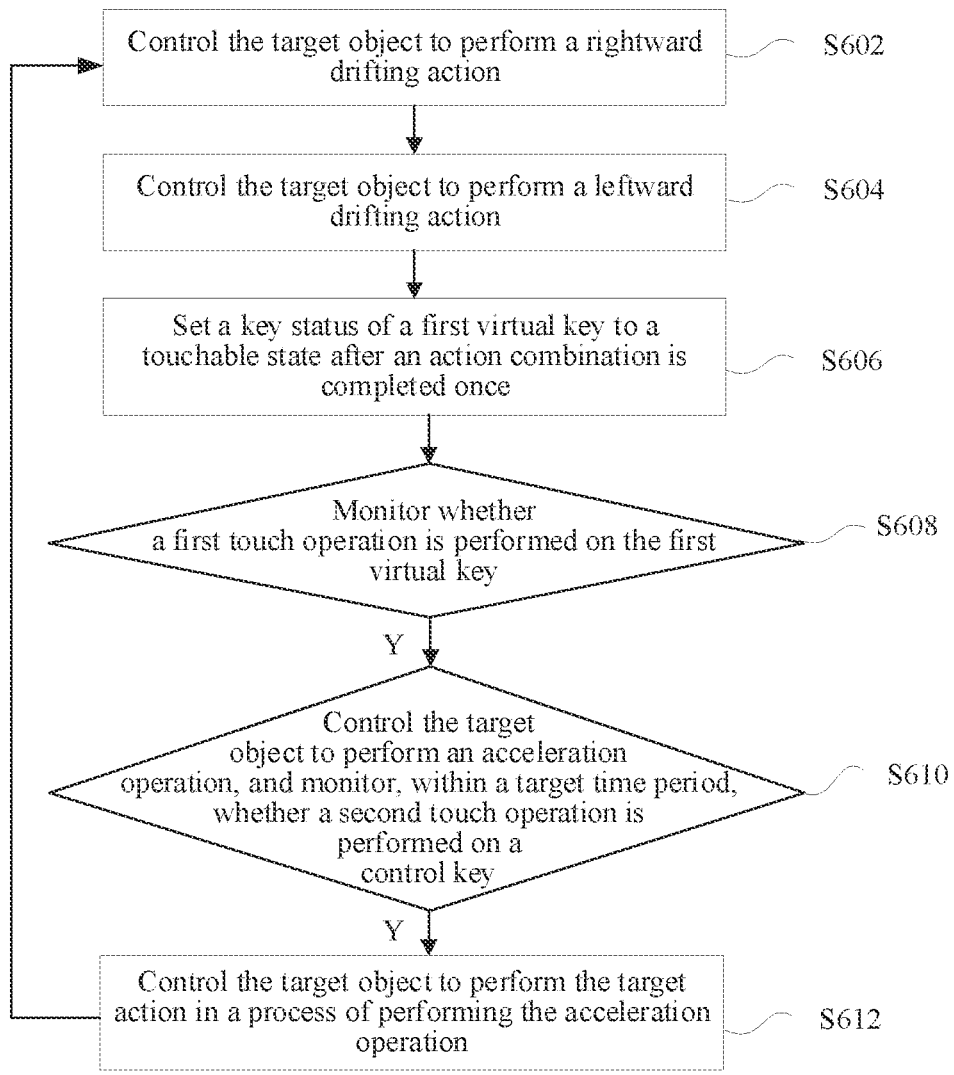
FIG. 6 is a flowchart of another action execution method according to an embodiment of this application.

Specifically, description is made with reference to examples shown in FIG. 5 and FIG. 6.

The racing game application is still used as an example. In a process of running a round of game, the target object (a virtual object 502 shown in FIG. 5) controlled by the user of the terminal device performs an action combination. For example, as shown in (a) and (b) in FIG. 5, the virtual object 502 first performs a leftward drifting action and then performs a rightward drifting action. In the foregoing process, the key status of the first virtual key is the acceleration key 402 in an untouchable state shown in (a) and (b) in FIG. 5.

As shown in (c) in FIG. 5, when the action combination is completed once, the key status of the first virtual key is set to a touchable state, as shown by the acceleration key 404 in a touchable state in the figure. Further, when a first touch operation performed on the acceleration key 404 in the touchable state is detected, and as shown in (d) in FIG. 5, a second touch operation performed on a control key 504 configured to control the virtual object 502 to perform the leftward drifting action is detected within a target time period, the virtual object 502 is controlled to perform the leftward drifting action during acceleration, so that the virtual object 502 may adjust, in a process of drifting leftward, an action trajectory to deviate to a traveling direction, to weaken the impact of a centrifugal force, and avoid that the virtual object 502 collides with an edge of the track, thereby reducing an error rate.

Further, a logical procedure of the action execution process shown in FIG. 5 may be shown as step S602 to step S612 shown in FIG. 6.

In step S602 and step S604, the user of the terminal device controls the target object (the virtual object 502 shown in FIG. 5) to first perform a rightward drifting action, and then controls the target object to perform a leftward drifting action. After the target object completes an action combination, including the foregoing two drifting actions, step S606 of adjusting the first virtual key (the acceleration key shown in FIG. 5) from the acceleration key 402 in the untouchable state to the acceleration key 404 in the touchable state is performed. Next, step S608 to step S612 are performed, which are specifically: monitoring whether a first touch operation is performed on the first virtual key; controlling, when the first touch operation is detected, the target object to perform an acceleration operation, and monitoring, within a target time period, whether a second touch operation is performed on a control key; and controlling, when the second touch operation is detected, the target object to perform a target action (such as the leftward drifting action and the rightward drifting action) in a process of performing the acceleration operation.

By using the embodiments provided in this application, in a process of running a round of game, when a target object controlled by a user of the terminal device completes an action combination once, a key status of a first virtual key configured to trigger an acceleration operation performed on the target object is set to a touchable state. Next, a first touch operation performed on the first virtual key is monitored. In a case that the first touch operation is detected, the target object is controlled to perform the acceleration operation, and a second touch operation performed on a control key configured to control the target object to perform a target action is monitored within a target time period. In a case that the second touch operation is detected within the target time period, the target object is controlled to perform the target action in a process of performing the acceleration operation, so that the target object adjusts a trajectory of the target object in the target action by using a velocity generated in the acceleration operation, to reduce a quantity of times of collision generated by the target object in the round of game, thereby reducing an error rate of action execution, and further resolving the problem of a relatively high error rate caused by different manual operation levels of players in the related art. Further, when a quantity of times of collision is reduced, a time required for the target object to participate in a round of game is further shortened, and a winning probability of the target object is improved.

In one implementation, the controlling, when the second touch operation is detected within the target time period, the target object to perform the target action in a process of performing the acceleration operation may specifically include S1 to S3.

S1. Use a driving force experienced by the target object in the process of performing the acceleration operation as an action force in a process of performing the target action.

S2. Determine, by using the action force, an actual velocity vector of the target object in the process of performing the target action.

S3. Determine, according to the actual velocity vector, a target action trajectory of the target object in the process of performing the target action, a quantity of times of collision generated in a process that the target object performs the target action according to the target action trajectory being less than a target threshold.

In this embodiment, in a process of running a round of game, the target object is subject to at least the following two forces: a driving force for driving the target object to travel and a friction between the target object and the surface of the track. For example, the target action is a drifting action. In a process in which the target object simultaneously performs the drifting action when performing the acceleration operation, a driving force that is generated by the acceleration operation and is used for driving the target object to travel is used as an action force of the target object. A friction generated in a process in which the target object performs the target action drives the target object to slide to a side of the track.

Figure 7:
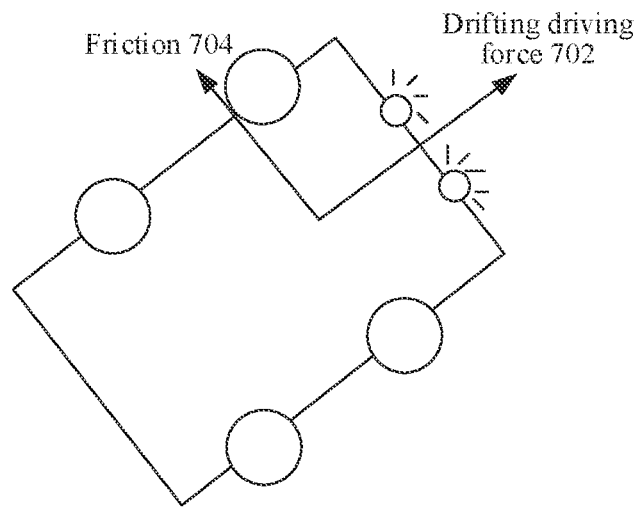
FIG. 7 is a schematic diagram of forces experienced by a target object in a process of performing a target action according to an embodiment of this application.

Description is specifically made with reference to the example shown in FIG. 7. It is assumed that a racing game application is used as an example, and the target object is a virtual vehicle participating in a round of racing game. If the virtual vehicle performs a rightward drifting action in a process of performing an acceleration operation, a driving force experienced by the virtual vehicle during the acceleration operation may be shown in FIG. 7 and used as a drifting driving force 702 for performing the rightward drifting action. The friction may be a friction 704 shown in FIG. 7, enabling the virtual vehicle to generate a centrifugal velocity vector for sliding to the left side of the track. The foregoing is merely an example, and this is not limited in this embodiment.

In one implementation, step S2 of determining, by using the action force, an actual velocity vector of the target object in the process of performing the target action may specifically include S21 and S22.

S21. Determine, according to the action force, a traveling velocity vector of the target object in the process of performing the target action, the magnitude of the traveling velocity vector of the target object in the process of performing the target action being greater than the magnitude of a traveling velocity vector of the target object after the target action has been completed.

S22. Determine, according to the traveling velocity vector of the target object in the process of performing the target action and a centrifugal velocity vector generated by the target object in the process of performing the target action, the actual velocity vector of the target object in the process of performing the target action, an included angle between a direction of the actual velocity vector of the target object in the process of performing the target action and a direction of the traveling velocity vector of the target object in the process of performing the target action being less than a first angle threshold.

The first angle threshold may be set to, but is not limited to, different values according to specific scenarios. For example, the first angle threshold may be, but is not limited to, an included angle between an actual velocity vector and a traveling velocity vector when the target object directly performs the target action without performing the acceleration operation. The foregoing is merely an example, and this is not limited in this embodiment.

Figure 8:
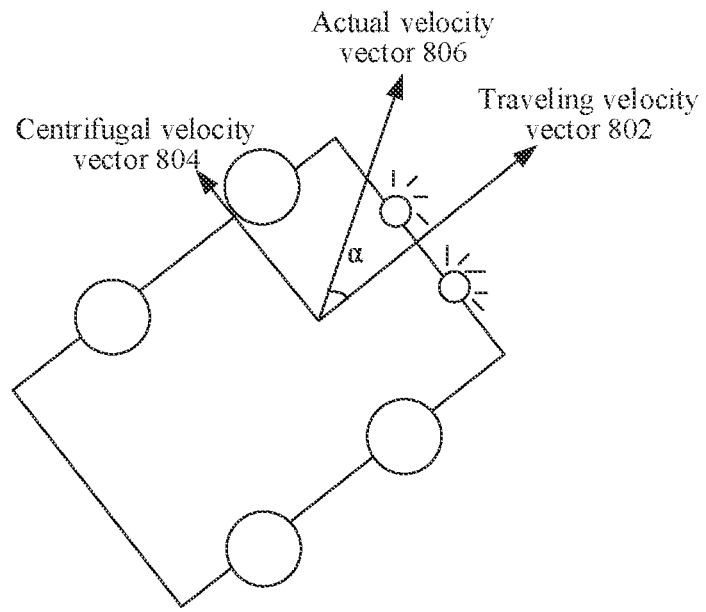
FIG. 8 is another schematic diagram of forces experienced by a target object in a process of performing a target action according to an embodiment of this application.

Description is specifically made with reference to the example shown in FIG. 8. It is assumed that the racing game application is still used as an example, and the target object is a virtual vehicle participating in a round of racing game. The virtual vehicle performs a rightward drifting action in a process of performing an acceleration operation. A driving force experienced by the virtual vehicle during the acceleration operation is used as an action force (such as a rightward drifting driving force), to determine a traveling velocity vector (such as a traveling velocity vector 802 shown in FIG. 8) of the virtual vehicle during rightward drifting. A friction generated in a driving process of the virtual vehicle is used for determining a centrifugal velocity vector (such as a centrifugal velocity vector 804 shown in FIG. 8) of the virtual vehicle.

Further, as shown in FIG. 8, vector calculation is performed by using the traveling velocity vector 802 and the centrifugal velocity vector 804, to obtain an actual velocity vector (such as an actual velocity vector 806 shown in FIG. 8) of the virtual vehicle. An included angle α between the actual velocity vector 806 and the traveling velocity vector 802 is less than a first angle threshold.

Figure 9:
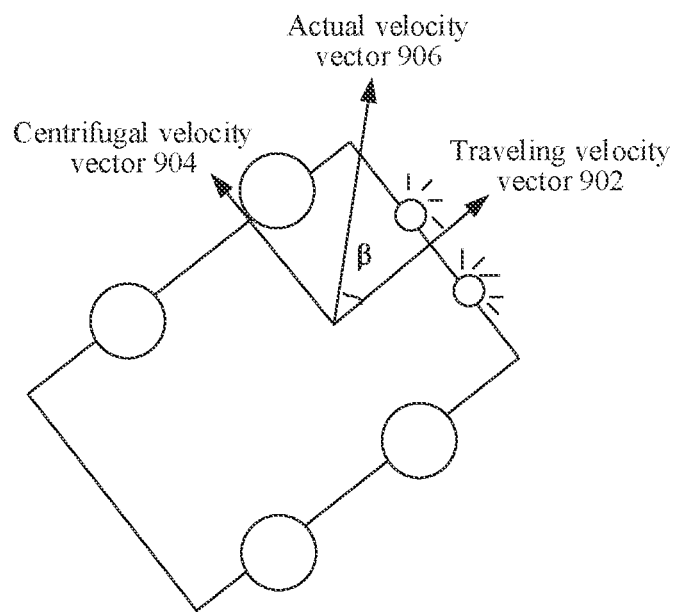
FIG. 9 is an schematic diagram of forces experienced by a target object in a process of performing a target action according to the related art.

In addition, it is assumed that FIG. 9 shows a case that the target object directly performs the target action without performing the acceleration operation. Vector calculation is performed according to a traveling velocity vector 902 and a centrifugal velocity vector 904, to determine an actual velocity vector 906. An included angle between the actual velocity vector 906 and the traveling velocity vector 902 is P. Due to interference of the acceleration operation, the traveling velocity vector 802 shown in FIG. 8 is greater than the traveling velocity vector 902 shown in FIG. 9. Correspondingly, it may be learned by comparing FIG. 8 with FIG. 9 that the angle α is less than the angle β. It may be assumed that the first angle threshold is, but not limited to, the angle β.

In the embodiments of this application, a driving force experienced by the target object in the process of performing the acceleration operation is used as an action force of the target object in the process of performing the target action, to adjust, by using the action force, an action trajectory of the target object in the process of performing the target action, to optimize control of the action trajectory of the target object, and reduce a quantity of times of collision caused by the friction, thereby reducing an execution error rate when the target object performs the target action.

In one implementation, the controlling, when the first touch operation is detected, the target object to perform the acceleration operation may specifically include S31 to S33.

S31. Determine, when the first touch operation is detected, a quantity of times that the first virtual key has been currently touched in the round of game.

S32. Obtain a target acceleration matching the quantity of times, the target acceleration being larger when the quantity of times is larger.

S33. Control the target object to perform the acceleration operation according to the target acceleration.

In one implementation, a quantity of times that the first virtual key is touched in the round of game may be, but is not limited to being, greater than 1. In this embodiment, as the quantity of times that the first virtual key is touched increases, a target acceleration corresponding to the acceleration operation may be alternatively, but is not limited to being, increased accordingly. That is, when the quantity of times that the first virtual key is touched is larger, the target acceleration is larger. The target acceleration may determine a corresponding adjustment proportion according to, but not limited to, the quantity of times.

In one implementation, step S32 of obtaining a target acceleration matching the quantity of times may specifically include S41 to S43.

S41. Obtain a target proportion matching the quantity of times.

S42. Increase a traveling acceleration of the target object according to the target proportion, to obtain an updated traveling acceleration.

S43. Use the updated traveling acceleration as the target acceleration.

In one implementation, the obtaining a target proportion matching the quantity of times may include, but is not limited to, one of the following:

(1) Search a pre-established mapping relationship for the target proportion configured for the current quantity of times. Different quantities of times and corresponding target proportions may have, but not limited to, an association relationship. For example, if the current quantity of times is m, the corresponding target proportion is determined as $r_m=10\%$. If the current quantity of times is m+1, the corresponding target proportion is determined as $r_{m+1}=12\%$. If the current quantity of times is m+2, the corresponding target proportion is determined as $r_{m+2}=15\%$. m is a positive integer.

(2) Calculate the corresponding target proportion according to the current quantity of times. Different quantities of times and corresponding target proportions may have, but not limited to, an association relationship. For example, it is assumed that the target proportion is gradually increased by 5% in each adjustment. When the current quantity of times is m, the corresponding target proportion is $r_m=10\%$. When the current quantity of times is m+1, the corresponding target proportion is $r_{m+1}=15\%$. When the current quantity of times is m+2, the corresponding target proportion is $r_{m+2}=20\%$.

The foregoing is merely an example. In a case that the first virtual key is continuously touched in a round of game, the target proportion matching the quantity of times may further include, but is not limited to, another configuration manner. This is not limited in this embodiment.

By using the embodiments provided in this application, as the quantity of times that the first virtual key is touched increases, an acceleration effect of the acceleration operation is correspondingly adjusted, so that the target object may complete a round of game in a quicker and more effective manner, thereby shortening a participation time of the target object, and improving a winning probability of the target object.

In one implementation, the control key (that is, a control key configured to control the target object to perform the target action) includes a first control key and a second control key. The first control key is configured to adjust a traveling direction of the target object, and the second control key is configured to trigger the target object to perform the target action. In addition, before the setting a key status of a first virtual key to a touchable state, the action execution method provided in the embodiments of this application further includes S210 and S212.

S210. Obtain an operation instruction generated by performing a long-press operation on the first control key and the second control key in a human-computer interaction interface displayed in the client.

S212. Control, in response to the operation instruction, the target object to perform the action combination, the action combination including: a first action performed by the target object by using the traveling direction as a first direction and a second action performed by the target object by using the traveling direction as a second direction.

In one implementation, the first control key may be, but is not limited to, an arrow key, including a left arrow key and a right arrow key. The second control key may be, but is not limited to, a drifting key for triggering a drifting action. When a long-press operation is performed on both the first control key and the second control key, an operation instruction is generated. The operation instruction is used for instructing the target object to perform the action combination. The action combination includes: a first action performed by the target object by using the traveling direction as a first direction and a second action performed by the target object by using the traveling direction as a second direction, for example, a leftward drifting action and a rightward drifting action.

By using the embodiments provided in this application, before the key status of the first virtual key is set to the touchable state, it is first detected whether the target object has completed the execution of the action combination. In a case that the action combination is completed, adjustment of the key status of the first virtual key is determined, to facilitate in interfering, by using the acceleration operation triggered by the first virtual key, with the target action performed by the target object, thereby optimizing an action trajectory of the target object for performing the target action, shortening a time of participating in a round of game, and improving a winning probability of the target object in a round of game.

In one implementation, the setting a key status of a first virtual key to a touchable state may specifically include S51 and S52.

S51. Detect a target angle generated in a process in which the target object switches from the first action to the second action, the target angle being an included angle between the traveling direction of the target object and a sliding direction of the target object.

S52. Determine, when the target angle is less than or equal to a second angle threshold, to adjust the key status of the first virtual key from an untouchable state to the touchable state.

Description is specifically made with reference to FIG. 5. It is assumed that the racing game application is still used as an example, and in a process of running a round of game, it is detected that the target object (the virtual object 502 shown in the figure) controlled by the user of the terminal device is performing an action combination. A drifting angle generated when the virtual object 502 performs the first action (such as the rightward drifting action) is a positive angle. For example, an included angle between the traveling direction (such as a direction of the traveling velocity vector of the virtual vehicle) and a sliding direction (such as a direction of an actual velocity vector of the virtual vehicle) of the target object is +γ. A drifting angle generated when the target object performs the second action (such as the leftward drifting action) is a negative angle. For example, an included angle between the traveling direction (such as a direction of the traveling velocity vector of the virtual vehicle) and a sliding direction (such as a direction of an actual velocity vector of the virtual vehicle) of the target object is −θ. γ and θ may be any angle, and α and β may be the same or may be different.

Further, if it is currently detected that the virtual object 502 has completed the first action (such as the rightward drifting action), and obtains an action instruction for performing the second action (such as the leftward drifting action), a target angle (which may also be referred to as a drifting angle) generated in a process of switching from the rightward drifting action to the leftward drifting action is detected in the process. The target angle gradually decreases from a positive angle to 0, and continues to decrease from 0 to a negative angle. Assuming that the pre-configured second angle threshold is 40°, when it is detected that the target angle decreases to 40° it is determined to adjust the key status of the first virtual key from an untouchable state to the touchable state. Correspondingly, the human-computer interaction interface displayed in the user of the terminal device may be shown in (b) and (c) in FIG. 5, and the acceleration key 402 in the untouchable state (displayed as a hollow circle) is correspondingly adjusted to the acceleration key 404 in the touchable state (displayed as a corresponding icon (the flame shown in the figure)).

By using the embodiments provided in this application, a target angle is detected to control and trigger automatic adjustment of the key status of the first virtual key, to simplify an adjustment operation of the key status, and improve the operation efficiency, thereby simplifying operation of action execution, and improving the efficiency of action execution.

For brief description, the foregoing method embodiments are redisplayed as a series of action combinations. However, a person skilled in the art is to appreciate that this application is not limited to the described order of the actions, because according to this application, some steps may be performed in other orders or simultaneously. In addition, a person skilled in the art is further to understand that the embodiments described in this specification are all exemplary embodiments, and the involved actions and modules are not necessarily required by this application.

According to another aspect of the embodiments of this application, an action execution apparatus configured to implement the action execution method is further provided. The action execution apparatus provided in the embodiments of this application is an apparatus corresponding to the foregoing action execution method. Therefore, for brevity, technical details of the action execution apparatus are not described again, and for the technical details of the action execution apparatus, reference may be made to the related content in the foregoing action execution method.

Figure 10:
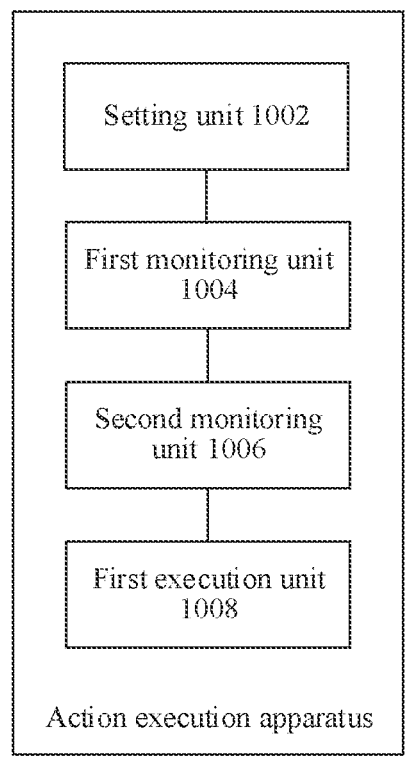
FIG. 10 is a schematic structural diagram of an action execution apparatus according to an embodiment of this application.

As shown in FIG. 10, the action execution apparatus includes:

a setting unit 1002, configured to set a key status of a first virtual key to a touchable state in a process of running a round of game when a target object controlled by a user of the terminal device completes an action combination once, the first virtual key being configured to trigger an acceleration operation performed on the target object;

a first monitoring unit 1004, configured to monitor a first touch operation performed on the first virtual key in the touchable state;

a second monitoring unit 1006, configured to: control, when the first touch operation is detected, the target object to perform the acceleration operation, and monitor, within a target time period, a second touch operation performed on a control key configured to control the target object to perform a target action, the target time period being less than or equal to a first time threshold; and a first execution unit 1008, configured to control, when the second touch operation is detected within the target time period, the target object to perform the target action in a process of performing the acceleration operation.

It can be seen that in the embodiments provided in this application, in a process of running a round of game, when a target object controlled by a user of the terminal device completes an action combination once, a key status of a first virtual key configured to trigger an acceleration operation performed on the target object is set to a touchable state. Next, a first touch operation performed on the first virtual key is monitored. In a case that the first touch operation is detected, the target object is controlled to perform the acceleration operation, and a second touch operation performed on a control key configured to control the target object to perform a target action is monitored within a target time period. In a case that the second touch operation is detected within the target time period, the target object is controlled to perform the target action in a process of performing the acceleration operation, so that the target object adjusts a trajectory of the target object in the target action by using a velocity generated in the acceleration operation, to reduce a quantity of times of collision generated by the target object in the round of game, thereby reducing an error rate of action execution, and further resolving the problem of a relatively high error rate caused by different manual operation levels of players in the related art. Further, when a quantity of times of collision is reduced, a time required for the target object to participate in a round of game is further shortened, and a winning probability of the target object is improved.

In one implementation, the first execution unit 1008 may specifically include:

a first determining module, configured to use a driving force experienced by the target object in the process of performing the acceleration operation as an action force in a process of performing the target action;

a second determining module, configured to determine, by using the action force, an actual velocity vector of the target object in the process of performing the target action; and a third determining module, configured to determine, according to the actual velocity vector, a target action trajectory of the target object in the process of performing the target action, a quantity of times of collision generated in a process that the target object performs the target action according to the target action trajectory being less than a target threshold.

In one implementation, in this embodiment, the second determining module may specifically include:

a first determining submodule, configured to determine, according to the action force, a traveling velocity vector of the target object in the process of performing the target action, the magnitude of the traveling velocity vector of the target object in the process of performing the target action being greater than the magnitude of a traveling velocity vector of the target object after the target action has been completed.

a second determining submodule, configured to determine, according to the traveling velocity vector of the target object in the process of performing the target action and a centrifugal velocity vector generated by the target object in the process of performing the target action, the actual velocity vector of the target object in the process of performing the target action, an included angle between a direction of the actual velocity vector of the target object in the process of performing the target action and a direction of the traveling velocity vector of the target object in the process of performing the target action being less than a first angle threshold.

It can be seen that in the embodiments provided in this application, a driving force experienced by the target object in the process of performing the acceleration operation is used as an action force of the target object in the process of performing the target action, to adjust, by using the action force, an action trajectory of the target object in the process of performing the target action, to optimize control of the action trajectory of the target object, and reduce a quantity of times of collision caused by the friction, thereby reducing an execution error rate when the target object performs the target action.

In one implementation, the second monitoring unit 1006 may specifically include:

a fourth determining module, configured to determine, when the first touch operation is detected, a quantity of times that the first virtual key has been currently touched in the round of game;

an obtaining module, configured to obtain a target acceleration matching the quantity of times, the target acceleration being larger when the quantity of times is larger; and a control module, configured to control the target object to perform the acceleration operation according to the target acceleration.

In one implementation, a quantity of times that the first virtual key is touched in the round of game may be, but is not limited to being, greater than 1. In this embodiment, as the quantity of times that the first virtual key is touched increases, a target acceleration corresponding to the acceleration operation may be alternatively, but is not limited to being, increased accordingly. That is, when the quantity of times that the first virtual key is touched is larger, the target acceleration is larger. The target acceleration may determine a corresponding adjustment proportion according to, but not limited to, the quantity of times.

In one implementation, in this embodiment, the obtaining module may specifically include:

an obtaining submodule, configured to obtain a target proportion matching the quantity of times;

an adjustment submodule, configured to increase a traveling acceleration of the target object according to the target proportion, to obtain an updated traveling acceleration; and a third determining submodule, configured to use the updated traveling acceleration as the target acceleration.

In one implementation, in this embodiment, the obtaining submodule may be specifically configured to search a pre-established mapping relationship for the target proportion configured for the current quantity of times. Different quantities of times and corresponding target proportions may have, but not limited to, an association relationship.

In one implementation, in this embodiment, the obtaining submodule may be specifically configured to calculate the corresponding target proportion according to the current quantity of times. Different quantities of times and corresponding target proportions may have, but not limited to, an association relationship.

The foregoing is merely an example. In a case that the first virtual key is continuously touched in a round of game, the target proportion matching the quantity of times may further include, but is not limited to, another configuration manner. This is not limited in this embodiment.

It can be seen that in the embodiments provided in this application, as the quantity of times that the first virtual key is touched increases, an acceleration effect of the acceleration operation is correspondingly adjusted, so that the target object may complete a round of game in a quicker and more effective manner, thereby shortening a participation time of the target object, and improving a winning probability of the target object.

In one implementation, the control key includes a first control key and a second control key, the first control key being configured to adjust a traveling direction of the target object, and the second control key being configured to trigger the target object to perform the target action. The action execution apparatus further includes:

an obtaining unit, configured to obtain, before the key status of the first virtual key is set to the touchable state, an operation instruction generated by performing a long-press operation on the first control key and the second control key in a human-computer interaction interface displayed in the client; and a second execution unit, configured to control, in response to the operation instruction, the target object to perform the action combination, the action combination including: a first action performed by the target object by using the traveling direction as a first direction and a second action performed by the target object by using the traveling direction as a second direction.

It can be seen that in the embodiments provided in this application, before the key status of the first virtual key is set to the touchable state, it is detected whether the target object has completed the execution of the action combination. In a case that the action combination is completed, adjustment of the key status of the first virtual key is determined, to facilitate in interfering, by using the acceleration operation triggered by the first virtual key, with the target action performed by the target object, thereby optimizing an action trajectory of the target object for performing the target action, shortening a time of participating in a round of game, and improving a winning probability of the target object in a round of game.

In one implementation, the setting unit 1002 may specifically include:

a detection module, configured to detect a target angle generated in a process in which the target object switches from the first action to the second action, the target angle being an included angle between the traveling direction of the target object and a sliding direction of the target object; and a setting module, configured to determine, when the target angle is less than or equal to a second angle threshold, to adjust the key status of the first virtual key from an untouchable state to the touchable state.

It can be seen that in the embodiments provided in this application, a target angle is detected to control and trigger automatic adjustment of the key status of the first virtual key, to simplify an adjustment operation of the key status, and improve the operation efficiency, thereby simplifying operation of action execution, and improving the efficiency of action execution.

Figure 11:
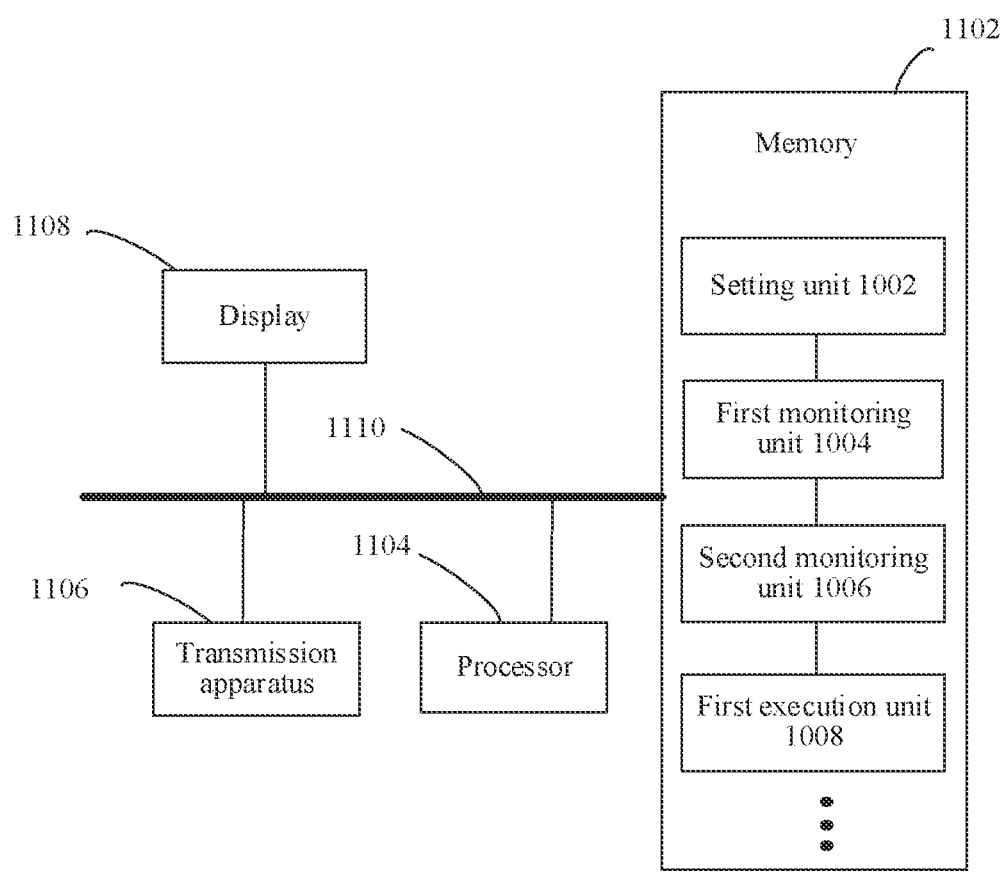
FIG. 11 is a schematic structural diagram of an electronic device according to an embodiment of this application.

According to still another aspect of the embodiments of this application, an electronic device configured to implement the foregoing action execution method is further provided. As shown in FIG. 11, the electronic device includes a memory 1102 and a processor 1104. The memory 1102 stores a computer program, and the processor 1104 is configured to perform the steps in any one of the foregoing method embodiments through the computer program.

In one implementation, the electronic device may be located in at least one of a plurality of network devices in a computer network.

In one implementation, the processor may be configured to perform the following steps by using the computer program:

setting a key status of a first virtual key to a touchable state in a process of running a round of game when a target object controlled by a user of the terminal device completes an action combination once, the first virtual key being configured to trigger an acceleration operation performed on the target object;

monitoring a first touch operation performed on the first virtual key in the touchable state;

controlling, when the first touch operation is detected, the target object to perform the acceleration operation, and monitoring, within a target time period, a second touch operation performed on a control key configured to control the target object to perform a target action, the target time period being less than or equal to a first time threshold; and controlling, when the second touch operation is detected within the target time period, the target object to perform the target action in a process of performing the acceleration operation.

A person of ordinary skill in the art may understand that, the structure shown in FIG. 11 is only illustrative. The electronic device may be alternatively a terminal device such as a smartphone (for example, an Android mobile phone or an iOS mobile phone), a tablet computer, a palmtop computer, a mobile Internet device (MID), or a PAD. FIG. 11 does not limit the structure of the electronic device. For example, the electronic device may further include more or fewer components (such as a network interface) than those shown in FIG. 11, or have a configuration different from that shown in FIG. 11.

The memory 1102 may be configured to store a software program and a module, for example, a program instruction/module corresponding to the action execution method and apparatus in the embodiments of this application, and the processor 1104 performs various functional applications and data processing by running a software program and a module stored in the memory 1102, that is, implementing the foregoing action execution method. The memory 1102 may include a high-speed random memory, and may also include a non-volatile memory, for example, one or more magnetic storage apparatuses, a flash memory, or another nonvolatile solid-state memory. In some embodiments, the memory 1102 may further include memories remotely disposed relative to the processor 1104, and the remote memories may be connected to a terminal through a network. Examples of the network include, but are not limited to, the Internet, an intranet, a local area network, a mobile communication network, and a combination thereof. The memory 1102 may be specifically, but is not limited to being, configured to store information such as related control information or operation instructions of the target object. In an example, as shown in FIG. 11, the memory 1102 may include, but is not limited to, the setting unit 1002, the first monitoring unit 1004, the second monitoring unit 1006, and the first execution unit 1008 in the foregoing action execution apparatus. In addition, the memory may further include, but is not limited to, other modules and units in the foregoing action execution apparatus. Details are not described herein again.

A transmission apparatus 1106 is configured to receive or transmit data through a network. Specific examples of the network may include a wired network and a wireless network. In an example, the transmission device 1106 includes a network interface controller (NIC). The NIC may be connected to another network device and a router by using a network cable, to communicate with the Internet or a local area network. In an example, the transmission device 1106 is a radio frequency (RF) module, which communicates with the Internet in a wireless manner.

In addition, the electronic device further includes: a display 1108, configured to display a target object and a target action performed by the target object; and a connection bus 1110, configured to connect various modular components in the foregoing electronic device.

According to still another aspect of the embodiments of this application, a storage medium is further provided. The storage medium stores a computer program, the computer program being configured to perform, when run, steps in any one of the foregoing method embodiments.

In one implementation, the storage medium may be configured to store the computer program for executing the following steps:

setting a key status of a first virtual key to a touchable state in a process of running a round of game when a target object controlled by a user of the terminal device completes an action combination once, the first virtual key being configured to trigger an acceleration operation performed on the target object;

monitoring a first touch operation performed on the first virtual key in the touchable state;

controlling, when the first touch operation is detected, the target object to perform the acceleration operation, and monitoring, within a target time period, a second touch operation performed on a control key configured to control the target object to perform a target action, the target time period being less than or equal to a first time threshold; and controlling, when the second touch operation is detected within the target time period, the target object to perform the target action in a process of performing the acceleration operation.

In one implementation, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

According to an aspect of the embodiments of this application, a computer program product including instructions is further provided, the computer program product, when run on a computer, causing the computer to perform the steps in any one of the foregoing method embodiments.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed user of the terminal device may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A drifting action execution method in a virtual gaming environment performed at a terminal device, the method comprising:
    setting a key status of a first virtual key to a touchable state in a process of running a round of game when a target object controlled by a user of the terminal device completes an action combination once in a first drifting action, the first virtual key being configured to trigger an acceleration operation performed on the target object;
    monitoring a first touch operation performed on the first virtual key in the touchable state;
    controlling, when the first touch operation is detected, the target object to perform the acceleration operation, and monitoring, within a target time period, a second touch operation performed on a control key configured to control the target object to perform a target action of a second drifting action different from the first drifting action, the target time period being less than or equal to a first time threshold; and
    controlling, when the second touch operation is detected within the target time period, the target object to perform the target action of the second drifting action in a process of performing the acceleration operation.

2. The method according to claim 1, wherein the controlling, when the second touch operation is detected within the target time period, the target object to perform the target action in a process of performing the acceleration operation comprises:
    using a driving force experienced by the target object in the process of performing the acceleration operation as an action force in a process of performing the target action;
    determining, by using the action force, an actual velocity vector of the target object in the process of performing the target action; and
    determining, according to the actual velocity vector, a target action trajectory of the target object in the process of performing the target action, a quantity of times of collision generated in a process that the target object performs the target action according to the target action trajectory being less than a target threshold.

3. The method according to claim 2, wherein the determining, by using the action force, an actual velocity vector of the target object in the process of performing the target action comprises:
    determining, according to the action force, a traveling velocity vector of the target object in the process of performing the target action; and
    determining, according to the traveling velocity vector of the target object in the process of performing the target action and a centrifugal velocity vector generated by the target object in the process of performing the target action, the actual velocity vector of the target object in the process of performing the target action, an included angle between a direction of the actual velocity vector of the target object in the process of performing the target action and a direction of the traveling velocity vector of the target object in the process of performing the target action being less than a first angle threshold.

4. The method according to claim 1, wherein the controlling, when the first touch operation is detected, the target object to perform the acceleration operation comprises:
    determining, when the first touch operation is detected, a quantity of times that the first virtual key has been currently touched in the round of game;

obtaining a target acceleration matching the quantity of times, the target acceleration being larger when the quantity of times is larger; and controlling the target object to perform the acceleration operation according to the target acceleration.

5. The method according to claim 4, wherein the obtaining a target acceleration matching the quantity of times comprises:

obtaining a target proportion matching the quantity of times;

increasing a traveling acceleration of the target object according to the target proportion, to obtain an updated traveling acceleration; and using the updated traveling acceleration as the target acceleration.

6. The method according to claim 1, wherein the control key comprises a first control key and a second control key, the first control key being configured to adjust a traveling direction of the target object, and the second control key being configured to trigger the target object to perform the target action; and before the setting a key status of a first virtual key to a touchable state, the method further comprises:

obtaining an operation instruction generated by performing a long-press operation on the first control key and the second control key in a human-computer interaction interface displayed in the client; and controlling, in response to the operation instruction, the target object to perform the action combination, the action combination comprising: a first action performed by the target object by using the traveling direction as a first direction and a second action performed by the target object by using the traveling direction as a second direction.

7. The method according to claim 6, wherein the setting a key status of a first virtual key to a touchable state comprises:

detecting a target angle generated in a process in which the target object switches from the first action to the second action, the target angle being an included angle between the traveling direction of the target object and a sliding direction of the target object; and determining, when the target angle is less than or equal to a second angle threshold, to adjust the key status of the first virtual key from an untouchable state to the touchable state.

8. A terminal device, comprising a memory and a processor, the memory storing a plurality of computer programs, and the processor, when executing the plurality of computer programs, causing the terminal device to perform a plurality of operations in a virtual gaming environment including:

setting a key status of a first virtual key to a touchable state in a process of running a round of game when a target object controlled by a user of the terminal device completes an action combination once in a first drifting action, the first virtual key being configured to trigger an acceleration operation performed on the target object;

monitoring a first touch operation performed on the first virtual key in the touchable state;

controlling, when the first touch operation is detected, the target object to perform the acceleration operation, and monitoring, within a target time period, a second touch operation performed on a control key configured to control the target object to perform a target action of a second drifting action different from the first drifting action, the target time period being less than or equal to a first time threshold; and controlling, when the second touch operation is detected within the target time period, the target object to perform the target action of the second drifting action in a process of performing the acceleration operation.

9. The terminal device according to claim 8, wherein the controlling, when the second touch operation is detected within the target time period, the target object to perform the target action in a process of performing the acceleration operation comprises:

using a driving force experienced by the target object in the process of performing the acceleration operation as an action force in a process of performing the target action;

determining, by using the action force, an actual velocity vector of the target object in the process of performing the target action; and determining, according to the actual velocity vector, a target action trajectory of the target object in the process of performing the target action, a quantity of times of collision generated in a process that the target object performs the target action according to the target action trajectory being less than a target threshold.

10. The terminal device according to claim 9, wherein the determining, by using the action force, an actual velocity vector of the target object in the process of performing the target action comprises:

determining, according to the action force, a traveling velocity vector of the target object in the process of performing the target action; and determining, according to the traveling velocity vector of the target object in the process of performing the target action and a centrifugal velocity vector generated by the target object in the process of performing the target action, the actual velocity vector of the target object in the process of performing the target action, an included angle between a direction of the actual velocity vector of the target object in the process of performing the target action and a direction of the traveling velocity vector of the target object in the process of performing the target action being less than a first angle threshold.

11. The terminal device according to claim 8, wherein the controlling, when the first touch operation is detected, the target object to perform the acceleration operation comprises:

determining, when the first touch operation is detected, a quantity of times that the first virtual key has been currently touched in the round of game;

obtaining a target acceleration matching the quantity of times, the target acceleration being larger when the quantity of times is larger; and controlling the target object to perform the acceleration operation according to the target acceleration.

12. The terminal device according to claim 11, wherein the obtaining a target acceleration matching the quantity of times comprises:

obtaining a target proportion matching the quantity of times;

increasing a traveling acceleration of the target object according to the target proportion, to obtain an updated traveling acceleration; and using the updated traveling acceleration as the target acceleration.

13. The terminal device according to claim 8, wherein the control key comprises a first control key and a second control key, the first control key being configured to adjust a traveling direction of the target object, and the second control key being configured to trigger the target object to perform the target action; and the plurality of operations further comprise:

before setting a key status of a first virtual key to a touchable state, obtaining an operation instruction generated by performing a long-press operation on the first control key and the second control key in a human-computer interaction interface displayed in the client; and controlling, in response to the operation instruction, the target object to perform the action combination, the action combination comprising: a first action performed by the target object by using the traveling direction as a first direction and a second action performed by the target object by using the traveling direction as a second direction.

14. The terminal device according to claim 13, wherein the setting a key status of a first virtual key to a touchable state comprises:

detecting a target angle generated in a process in which the target object switches from the first action to the second action, the target angle being an included angle between the traveling direction of the target object and a sliding direction of the target object; and determining, when the target angle is less than or equal to a second angle threshold, to adjust the key status of the first virtual key from an untouchable state to the touchable state.

15. A non-transitory computer-readable storage medium, storing a plurality of computer programs, the computer programs, when executed by a processor of a terminal device, causing the terminal device to perform a plurality of operations in a virtual gaming environment including:

setting a key status of a first virtual key to a touchable state in a process of running a round of game when a target object controlled by a user of the terminal device completes an action combination once in a first drifting action, the first virtual key being configured to trigger an acceleration operation performed on the target object;

monitoring a first touch operation performed on the first virtual key in the touchable state;

controlling, when the first touch operation is detected, the target object to perform the acceleration operation, and monitoring, within a target time period, a second touch operation performed on a control key configured to control the target object to perform a target action of a second drifting action different from the first drifting action, the target time period being less than or equal to a first time threshold; and controlling, when the second touch operation is detected within the target time period, the target object to perform the target action of the second drifting action in a process of performing the acceleration operation.

16. The non-transitory computer-readable storage medium according to claim 15, wherein the controlling, when the second touch operation is detected within the target time period, the target object to perform the target action in a process of performing the acceleration operation comprises:

using a driving force experienced by the target object in the process of performing the acceleration operation as an action force in a process of performing the target action;

determining, by using the action force, an actual velocity vector of the target object in the process of performing the target action; and determining, according to the actual velocity vector, a target action trajectory of the target object in the process of performing the target action, a quantity of times of collision generated in a process that the target object performs the target action according to the target action trajectory being less than a target threshold.

17. The non-transitory computer-readable storage medium according to claim 16, wherein the determining, by using the action force, an actual velocity vector of the target object in the process of performing the target action comprises:

determining, according to the action force, a traveling velocity vector of the target object in the process of performing the target action; and determining, according to the traveling velocity vector of the target object in the process of performing the target action and a centrifugal velocity vector generated by the target object in the process of performing the target action, the actual velocity vector of the target object in the process of performing the target action, an included angle between a direction of the actual velocity vector of the target object in the process of performing the target action and a direction of the traveling velocity vector of the target object in the process of performing the target action being less than a first angle threshold.

18. The non-transitory computer-readable storage medium according to claim 15, wherein the controlling, when the first touch operation is detected, the target object to perform the acceleration operation comprises:

determining, when the first touch operation is detected, a quantity of times that the first virtual key has been currently touched in the round of game;

obtaining a target acceleration matching the quantity of times, the target acceleration being larger when the quantity of times is larger; and controlling the target object to perform the acceleration operation according to the target acceleration.

19. The non-transitory computer-readable storage medium according to claim 18, wherein the obtaining a target acceleration matching the quantity of times comprises:

obtaining a target proportion matching the quantity of times;

increasing a traveling acceleration of the target object according to the target proportion, to obtain an updated traveling acceleration; and using the updated traveling acceleration as the target acceleration.

20. The non-transitory computer-readable storage medium according to claim 15, wherein the control key comprises a first control key and a second control key, the first control key being configured to adjust a traveling direction of the target object, and the second control key being configured to trigger the target object to perform the target action; and the plurality of operations further comprise:

before setting a key status of a first virtual key to a touchable state, obtaining an operation instruction generated by performing a long-press operation on the first control key and the second control key in a human-computer interaction interface displayed in the client; and controlling, in response to the operation instruction, the target object to perform the action combination, the action combination comprising: a first action performed by the target object by using the traveling direction as a first direction and a second action performed by the target object by using the traveling direction as a second direction.

\* \* \* \* \*